United States Patent
Ramananda et al.

(10) Patent No.: US 8,924,794 B2
(45) Date of Patent: Dec. 30, 2014

(54) METHOD AND COMPUTER PROGRAM PRODUCT FOR FORECASTING SYSTEM BEHAVIOR

(75) Inventors: Balasubramanya Ramananda, Karnataka (IN); Dinesh Bhaskar Sharma, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 851 days.

(21) Appl. No.: 12/867,445

(22) PCT Filed: Feb. 21, 2008

(86) PCT No.: PCT/IN2008/000102
§ 371 (c)(1),
(2), (4) Date: Aug. 12, 2010

(87) PCT Pub. No.: WO2009/104196
PCT Pub. Date: Aug. 27, 2009

(65) Prior Publication Data
US 2010/0332911 A1 Dec. 30, 2010

(51) Int. Cl.
*G06F 11/00* (2006.01)
*G06F 11/36* (2006.01)
*G06F 11/34* (2006.01)

(52) U.S. Cl.
CPC .......... *G06F 11/008* (2013.01); *G06F 11/3476* (2013.01); *G06F 2201/86* (2013.01); *G06F 11/3447* (2013.01); *G06F 11/3612* (2013.01)
USPC ........................................................ 714/45

(58) Field of Classification Search
USPC .................................................. 714/47.1, 45
See application file for complete search history.

(56) References Cited

U.S. PATENT DOCUMENTS

| 5,014,226 | A | * | 5/1991 | Horstmann et al. | 714/734 |
| 5,596,712 | A | * | 1/1997 | Tsuyama et al. | 714/26 |
| 5,889,993 | A | | 3/1999 | Kroeger et al. | |
| 6,353,902 | B1 | * | 3/2002 | Kulatunge et al. | 714/712 |

(Continued)

FOREIGN PATENT DOCUMENTS

WO WO02054223 7/2002

OTHER PUBLICATIONS

Dictionary definition (Merriam Webster) for "recurrence", retrieved from http://www.merriam-webster.com/dictionary/recurrence on May 17, 2013.*

(Continued)

*Primary Examiner* — Yair Leibovich
(74) *Attorney, Agent, or Firm* — Elkington and Fife LLP; Nicholas Ertl

(57) ABSTRACT

A method is disclosed for forecasting the behavior of an information technology system for executing a plurality of applications. In an embodiment, the method comprises the steps of monitoring (110) the execution of selected applications over a predefined time period, compiling (120) a trace of events indicating unintended behavior of the system during said period, determining (130) a correlation between an initial event and a subsequent event in said trace and forecasting (140) a recurrence of the subsequent event based on said correlation in response to a recurrence of the initial event. This facilitates a user to avoid or at least reduce the risk of future occurrence of events that may have a detrimental impact on the performance of the IT system.

20 Claims, 3 Drawing Sheets

(56) References Cited

U.S. PATENT DOCUMENTS

| | | | |
|---|---|---|---|
| 6,874,105 B2 * | 3/2005 | Buechner et al. | 714/39 |
| 7,017,084 B2 * | 3/2006 | Ng et al. | 714/45 |
| 7,062,540 B2 * | 6/2006 | Reddy et al. | 709/217 |
| 7,409,604 B2 * | 8/2008 | Murphy et al. | 714/48 |
| 7,571,360 B1 * | 8/2009 | Lewicki et al. | 714/704 |
| 2005/0091005 A1 * | 4/2005 | Huard | 702/186 |
| 2007/0018601 A1 * | 1/2007 | Steinbach et al. | 318/568.11 |

OTHER PUBLICATIONS

International Searching Authority, International Search Report and the Written Opinion, 10 pages, Oct. 2008.

* cited by examiner

METHOD AND COMPUTER PROGRAM PRODUCT FOR FORECASTING SYSTEM BEHAVIOR

CROSS-REFERENCE TO RELATED APPLICATION

This application is a national stage application under 35 U.S.C. §371 of PCT/IN2008/000102, filed 21 Feb. 2008.

The present invention relates to a method and computer program product for forecasting the behavior of an information technology (IT) system for executing a plurality of applications.

IT systems for executing a multitude of applications such as software applications have become extremely complex. Examples of such IT systems include operating systems such as Windows, UNIX, Linux and so on, and may be implemented on a standalone device or on a network interconnecting multiple computers. Such a network may comprise multiple domains. The complexity of such systems may arise from the large number of applications available to the system or from the complexity of the applications themselves. The complex nature of these systems has made it unfeasible to design error-free systems. For instance, because the applications may come from a number of third-party sources, the correct operation of these applications, their compatibility and so on cannot be guaranteed.

In order to provide the user of such systems with insights into the system behaviour, there are now several event based management products available on the market such as the Hewlett Packard (HP) Operations Manager for monitoring the behaviour of the IT system. These products have the capability of monitoring and reporting back to the user any events indicating unexpected, e.g. erroneous, system behaviour. This for instance may provide the user or the manager of the system with a warning that the result produced by the system may be unreliable, or with valuable insights as to why the production of a result has failed, e.g. because of the unavailability of a software or hardware resource.

A problem with the existing system monitoring products is that the occurrence of an event indicating a deviation from intended system behaviour is produced after the occurrence of the event. This is particularly disadvantageous if the occurred event causes a disruption to the system's operation, e.g. a system crash, since this, amongst others, has a detrimental effect on the availability of the system and consequently of the productivity of the users of the system.

Embodiments of the present invention seek to overcome at least some of the aforementioned drawbacks.

Embodiments of the invention are described in more detail and by way of non-limiting examples with reference to the accompanying drawings, wherein FIG. 1 is a flowchart of an embodiment of the method of the present invention;

It should be understood that the Figures are merely schematic and are not drawn to scale. It should also be understood that the same reference numerals are used throughout the Figures to indicate the same or similar parts.

Figure 1:
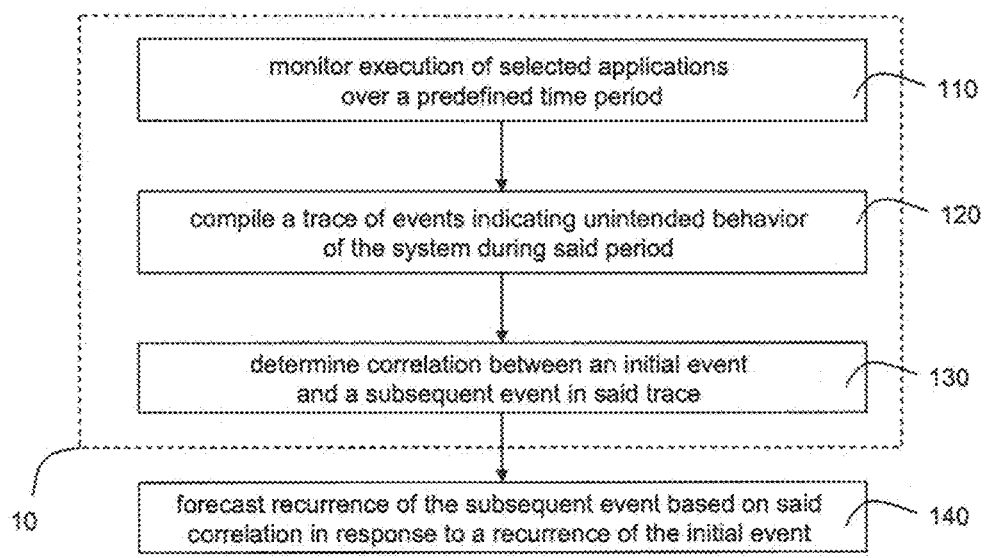

FIG. 1 depicts a flowchart of a method of forecasting the behavior of an information technology system for executing a plurality of applications in accordance with an embodiment of the present invention. In a first step 110, the execution behavior of selected applications of the IT system is monitored over a predefined time period. In step 120, a trace of events indicating unintended behavior of the system is compiled. An event may be an erroneous termination of an application, unavailability of a system resource, the occurrence of a suspected incorrect result, and so on. The trace of events, which may be recorded in a list, typically comprises a list of events occurring in chronological order, including a time stamp indicating the date and/or time of the occurrence of the event. In step 130, the trace of events is evaluated to determine a correlation between an initial event and a subsequent event in said trace. In the context of the present invention, an initial event is any event that precedes a subsequent event. It is not intended to only cover the first event in the trace. For instance, consider the simplified example of a trace:

| Event | Date | Time |
|---|---|---|
| A | 21 Jan. 2008 | 02:13 |
| B | 21 Jan. 2008 | 03:28 |
| C | 21 Jan. 2008 | 06:13 |
| D | 21 Jan. 2008 | 12:26 |
| A | 21 Jan. 2008 | 22:56 |
| C | 21 Jan. 2008 | 23:52 | collected on 21 Jan. 2008 for an arbitrary IT system comprises four different events. Event A occurring at 02:13 is an initial event for subsequent event B occurring at 03:28 and event A occurring at 22:56 is an initial event for subsequent event C occurring at 23:52, whereas event D occurring at 12:26 is an initial event for subsequent event A, and so on.

From the above example, it will be clear that the occurrence of an initial event may not always lead to the occurrence of the same subsequent event. This is because the occurrence of such events depends on the actual state of the system, which typically comprises a large number of parameters that each can adopt a large number of different values. Because the state of the system at the time of the occurrence of an initial event can change in a large number of different ways, a large number of different subsequent events may occur depending on the actual changes to the state. Examples of state changes include the execution of new instructions within an application, the execution of instructions of a subsequently launched application, changes in the available system resources, changes in the number of users of the system, and so on.

The embodiment of the method of the present invention shown in FIG. 1 is based on the realization that although the development of the system state cannot be accurately monitored following the occurrence of an initial event, certain changes are more likely to occur than other changes. In other words, the occurrence of an initial event is more likely to be followed by certain subsequent events than by other subsequent events. This can be determined by evaluating the trace of events over a predetermined time that is long enough to establish such differences.

For instance, monitoring of the aforementioned arbitrary IT system may resulting in a trace from which it becomes clear that in 60% of all occurrences of event A, this event is followed by event B, whereas the remaining 40% of occurrences of event A, this event is followed by event C. Such correlations between initial events and subsequent events are typically established in step 130 by evaluation of the trace of events collected in step 120. Such correlations may include the probability of the occurrence of the subsequent event following the occurrence of the initial event, as well as the average time interval between the occurrence of the subsequent event and the occurrence of the initial event. Other suitable correlation information may also be used.

In an alternative embodiment, the correlation between the initial event and the subsequent event may comprise a weight factor. This weight factor may reflect the impact on the IT system if the subsequent event were to occur, e.g. a subsequent event causing a system crash would be given a high weight factor. This facilitates the recognition of subsequent events having a serious impact on the correct functioning of the IT system.

In step 140, the established correlations are subsequently used to forecast the probability of the recurrence of a subsequent event in response to a recurrence of an initial event. For instance, when using the above example, after the predictive event messaging method has completed its initialization phase indicated by box 10, the recurrence of an event A, e.g. the occurrence of the event A during the monitoring phase of the method, triggers the prediction at a probability of 0.6 that event B is the next event to occur and the prediction at a probability of 0.4 that event C is the next event to occur.

At this point, it is emphasized that the steps 110 and 120 may be executed in any suitable way. For instance, the correlations determined in step 130 may be based on an already available event history that has been collected during system operation over a predefined time period. Alternatively, a dedicated trace of events may be generated during a user-defined time period. Combinations of these alternatives are equally feasible. In fact, the method of the present invention is not limited to any specific way of collecting the event information; any suitable event collection approach may be used.

Figure 2:
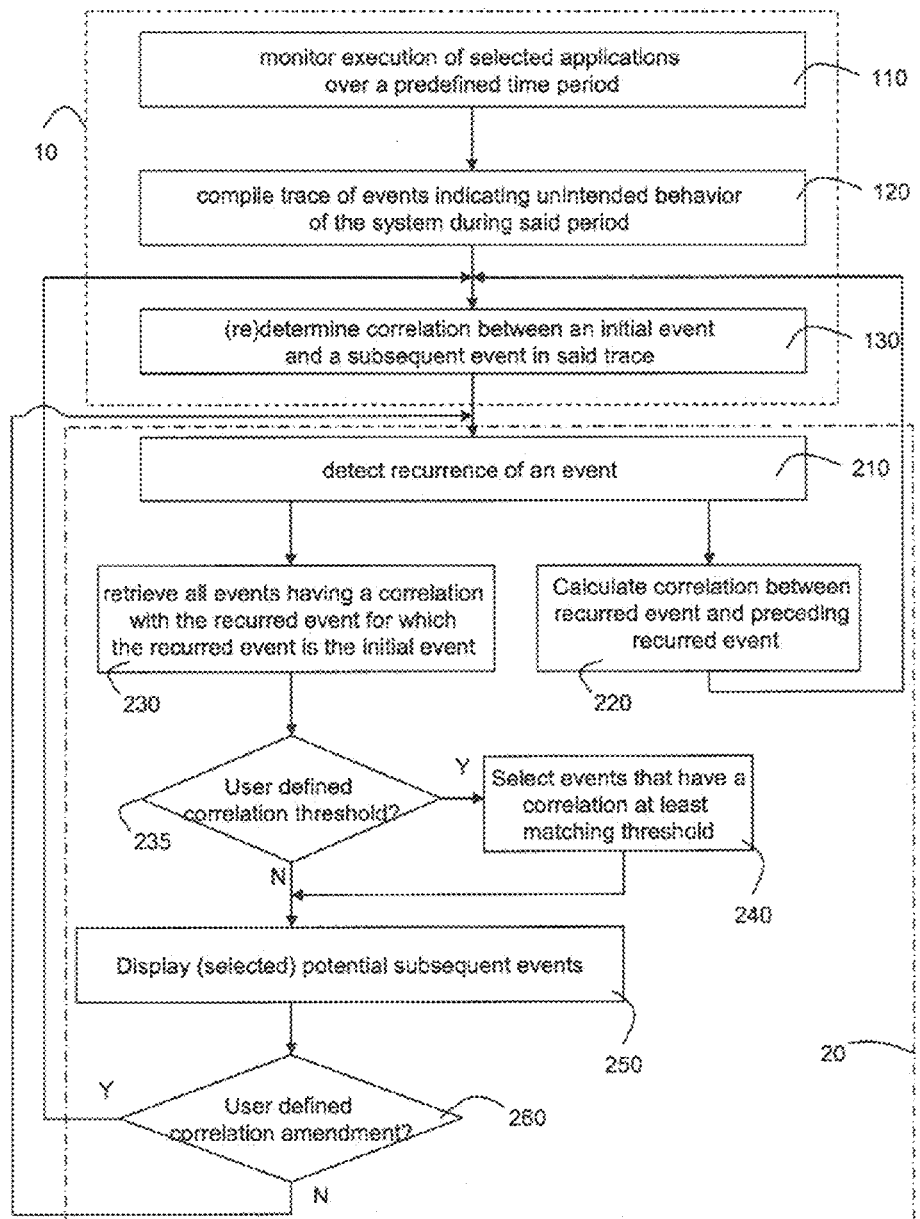
FIG. 2 is a flowchart of another embodiment of the method of the present invention.

FIG. 2 shows an embodiment of a monitoring phase 20 of the method of the present invention in more detail. The monitoring phase 20 is an embodiment of step 140 in FIG. 1. In step 210, a recurrence of an event that occurred in the initialization phase 10 is detected. This triggers the retrieval of at least all events for which the event detected in step 210 is known to be an initial event together with the correlations between these respective events in step 230.

Preferably, a system user executing the monitoring method of the present invention has the option to provide a correlation threshold in step 235 such that potential subsequent events having a correlation value below this threshold e.g. a low occurrence probability, can be filtered out of the collection of events retrieved in step 230. This reduces the risk of the user being confronted with an excessive number of potential subsequent events. This filtering out is demonstrated in step 240, after which the list of potential subsequent events together with their correlation, e.g. an occurrence probability, and/or the time frame in which its occurrence is expected, is displayed to the user in step 250. However, if the user has not specified such a threshold, or if the option of defining such a threshold is not available, the method may directly proceed from step 230 to step 250.

The user may use the prediction information presented to him in step 250 to improve the quality of the correlations between initial events and subsequent events. This is demonstrated in step 260. For instance, the method may allow the user to individually select each of the correlations displayed in step 250, and manually amend the correlation, in which case the method reverts back to step 130.

Such an amendment may include adjusting the occurrence probability of the subsequent event, adjusting the average time interval between the initial event and the subsequent event and so on. The amendment may also include the deletion of the correlation. This allows the user to transfer his knowledge of the IT system monitored by the method of the present invention to the database of correlations, thereby improving the accuracy of the correlations, and, as a consequence, of the forecasts. For instance, a user may be aware of the fact that the occurrence of a certain subsequent event was caused by a particular problem with the IT system during the initialization phase 10 of the method, which since has been rectified. In such a case, the correlation between the recurred initial event and the subsequent event may be deleted.

However, if the user has not specified such an amendment, or if the correlation amendment option is not available, the method may directly proceed from step 260 to step 210.

The method of the present invention may also use the recurrence of an event in step 210 to further improve the correlations between initial events and subsequent events. This is demonstrated in step 220. Upon recurrence of an event in step 210, the actual time interval between the event detected in step 210 and its preceding event, i.e. its initial event, is determined, and compared with the average time interval in the correlation between these two events. In case of a discrepancy between these two time intervals, the correlation between these events may be amended, i.e. improved, based on the actual time interval determined in step 220, as indicated in FIG. 2 by the method regressing to step 130 from step 220.

In an embodiment, the correlations are updated, i.e. improved, in a continuous fashion, e.g. every time the occurrence of an event is forecasted. This ensures that the accuracy of the forecasting method improves over time, and further ensures that if certain correlations have a time-dependent nature, this time-dependent nature is captured by such continuous updates.

Figure 3:
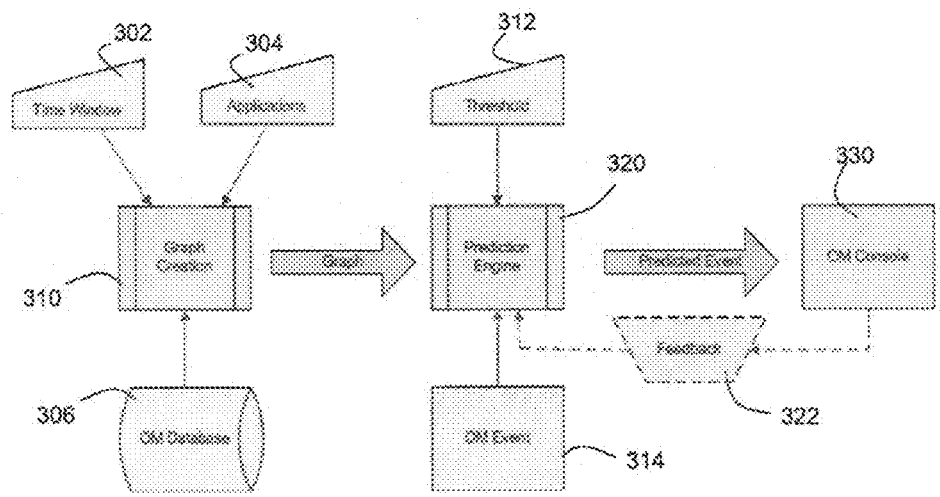
FIG. 3 depicts a workflow for a computer program product implementing an embodiment of the method of the present invention.

FIG. 3 schematically depicts an embodiment of a system 300 comprising a computer program product implementing the method of the present invention. Such a computer program product may be an event management system extended with an embodiment of the forecasting method of the present invention.

The system 300 has a user interface (not shown), e.g. a mouse, a keyboard, speech recognition means or any other suitable interface for receiving instructions from a user. In accordance with an embodiment of the method of the present invention, the user provides the user interface with a time window 302 and selected applications 304 for monitoring the generation of events during execution of the applications 304 in the time window 302. As previously explained, the time window 302 may be defined in the future, in which case a trace of events is to be generated during the specified time window, as well as in the past, in which case the trace of events is already present, for instance in the form of an event database 306. The specified time window 302 may cover part or whole of the time period registered in the database 306. The database 306 may have any suitable form, e.g. a trace file or a more elaborate data structure, and may comprise any relevant event occurrence information, such as date and time of the occurrence of the event and application generating the event.

Figure 4:
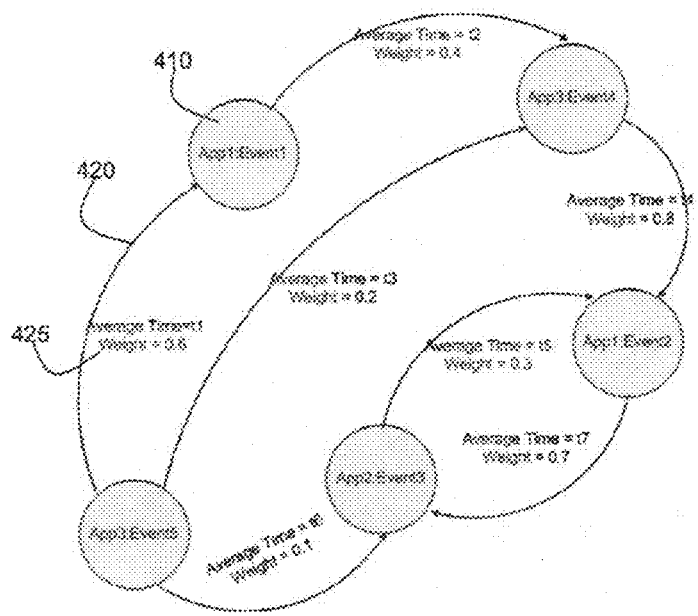
FIG. 4 depicts a graph produced by executing an embodiment of the method of the present invention.

The time window 302, selected applications 304 and database of events 306 are used to generate a graph 310 which depicts the events as well as the correlations connecting them. The correlations may be calculated as previously explained, or in any other suitable way. An example of such a graph is given in FIG. 4. The graph 400 has a number of nodes 410 interconnected by edges 420. The nodes 410 are formed by the events generated by the selected applications 304 during the time window 302, with connecting edges 420 indicating a correlation between the nodes 410. In FIG. 4, a graph 400 is shown for three selected applications labeled App1, App2 and App 3. The choice of three applications is by way of non-limiting example only. It will be understood that other numbers of selected applications are equally feasible.

In an embodiment, the edges 420 are unidirectional and are directed from an initial event to a subsequent event. The directionality of the edges is determined by the chronological order of the events in the graph 400. The edges 420 may have a length proportional to the average time interval between the occurrences of its initial event and subsequent event. It will be appreciated that such an edge length typically has a maximum length of the time window 402. The edges 420 may further comprise a parameter 425 that quantifies the correlation between the initial event and the subsequent event. For instance, the parameter 425 may depict the probability of the occurrence of the subsequent event during the specified time interval, and may comprise a further parameter indicating the average time interval between the two events. In an embodiment, the probability may be combined with or replaced by the weight of the correlation. The weight of the correlation may be attached to the graph by the user, and may reflect the severity of the subsequent event, e.g. an event leading to a system failure. It will be appreciated that the present invention is not limited to depicting the aforementioned parameters 425 in combination with an edge 420; other suitable parameters may also be depicted. In addition, the parameters such as the probability of the occurrence of a subsequent event following the occurrence of an initial event may also be depicted graphically, e.g. by means of the thickness of an edge.

In FIG. 4, the graph 400 includes an initial event App3: Event5 (i.e. an event 5 in application 3) which occurrence can lead to the occurrence of three different subsequent events:
- an event App1:Event1 (i.e. an event, 1 in application 1) with an average time interval t1 between the occurrence of these two events and an occurrence probability of 0.6 (Weight=0.6),
- an event App3:Event4 (i.e. an event 4 in application 3) with an average time interval t3 between the occurrence of these two events and an occurrence probability of 0.2 (Weight=0.2), and
- an event App2:Event3 (i.e. an event 3 in application 2) with an average time interval t6 between the occurrence of these two events and an occurrence probability of 0.1 (Weight=0.1).

Amongst other information, the graph further provides the user with information that App1:Event1 is an initial event to App3:Event4 with a probability of 0.4 and a time interval t2 between the two events, and that App2:Event3 and App1:Event2 can be either initial events or subsequent events to each other, with the occurrence of App1:Event2 following the occurrence of App2:Event3 having a probability of 0.3 and the occurrence of App2:Event3 following the occurrence of App1:Event2 having a probability of 0.7. Hence, it will be clear that the graph 400, which preferably is displayed on a display, e.g. console 330, of the system 300, but may be made available to the user in any other suitable way, e.g. as a hard copy, gives the user valuable insights in the behavior of the IT system during the monitoring phase implemented by the various embodiments of the method of the present invention. Now, returning to FIG. 3, the graph 400 may be made available to a prediction engine 320 of the system 300. The prediction engine 320, which in an embodiment implements step 140 of the method shown in FIG. 1, monitors the occurrence of an event 314 during the execution of applications on the IT system monitored by the method of the present invention. Upon detection of an event 314, the prediction engine 320 is arranged to identify the event in the graph 400 and to provide the user of the system 300 with a list of subsequent events that pay follow the occurrence of the event 314. Such a list may be presented to the user in any suitable way. Preferably, the list is presented in the form of graph 400, in which the detected event 314 may be highlighted to draw the attention of the user to the detected event, or the event 314 may be brought to the attention of the user in any other suitable way, e.g. by reconstructing the graph 400 such that the event 314 is placed in a predefined position, e.g. as the leftmost node 410 in the graph 400.

This presents the user with an immediate overview of potential occurrence of future events following the detection of event 314. This enables to user to adjust his actions on the system 300 such that the potential occurrence of serious events, e.g. events that can cause the destabilization of the system 300, can be avoided. Moreover, the graph 400 may provide the user with valuable insights as to why, the event 314 actually occurred in case the event 314 is shown as a subsequent event of an initial event. This may enable the user to establish the root cause of the occurrence of event 314, which may enable the user to adjust the system 300 such that the risk of recurrences of event 314 is either reduced or eliminated.

In an embodiment, the user is empowered to amend the information in the list, e.g. graph 400, presented to him by the prediction engine 320. For instance, the user may be empowered to adjust the correlation parameters 425 in the graph or to delete a correlation altogether. The user may want to amend a correlation if the detected event 314 is a critical or severe event, in which case the weight of the correlation with its preceding event may be increased, to enable the user to take actions to avoid the recurrence of event 314 upon detection of the preceding event. The user may further delete correlations from the list of correlations, e.g. from the graph 400, e.g. in case the user is aware of a correlation being incorrect. Such user actions, which are fed back to the prediction engine 320 by means of feedback path 322, improve the quality of the event prediction method. In case of the list being presented in the form of a graph 400, the user may select the correlation to be amended by selecting the corresponding edge 420 between two nodes 410, or in any other suitable way.

In an embodiment, the user may also be empowered to instruct the prediction engine 320 to include only those subsequent events in the list generated by the prediction engine 320 following the detection of an event 314 that meet a user-defined threshold 312. For instance, the user may instruct the prediction engine 312 to include only those events in the list, e.g. in the graph 400, that have a weight of at least 0.5. This way, the user for instance can prevent the presentation of events on the console 330 that have little impact on the behavior of the system 300, and for which no evasive actions are required.

The above described various embodiments of the method of the present invention may be implemented in a computer program product that, when executed on a computer, performs one or more of the above discussed steps of method of the present invention, such as the steps shown in FIG. 1 and/or in FIG. 2.

Since implementation of these steps in a computer program product may be achieved by a person skilled in the art using his routine skills, such implementation details will not be discussed in further detail for the sake of brevity only. The computer program product may be made available on any suitable computer-readable medium such as a CD-ROM, DVD, memory stick, hard disk of an internet accessible server and so on.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of forecasting a behavior of an information technology system for executing a plurality of applications, comprising:
   monitoring execution of selected applications over a predefined time period;
   compiling a trace of events indicating unintended behavior of the system during said period;
   determining a correlation between an initial event and a subsequent event in said trace;
   forecasting a recurrence of the subsequent event based on said correlation in response to a recurrence of the initial event; and
   constructing, by a computer, a graph, wherein nodes of the graph represent events that occurred during said period and edges of the graph represent correlations between the events represented by the nodes.

2. The method of claim 1, wherein determining the correlation between the initial event and the subsequent event in said trace comprises determining a probability of an occurrence of the subsequent event following an occurrence of the initial event.

3. The method of claim 2, wherein determining the correlation between the initial event and the subsequent event in said trace further comprises determining a time interval between an occurrence of the subsequent event and an occurrence of the initial event.

4. The method of claim 3, wherein at least one of the edges has a length indicating the time interval and an associated parameter indicating said probability.

5. The method of claim 3, wherein the time interval is an average time interval.

6. The method of claim 1, further comprising:
   observing a recurrence of an event;
   notifying a user of said observed recurrence; and
   listing at least a subset of all subsequent events that have a determined correlation with said observed recurred event.

7. The method of claim 6, further comprising:
   receiving an event correlation threshold from the user;
   wherein listing the at least a subset of all subsequent events that have the determined correlation with said observed recurred event comprises listing subsequent events that have the determined correlation based on said threshold.

8. The method of claim 1, further comprising:
   observing a recurrence of an initial event;
   observing a recurrence of a subsequent event;
   determining a further correlation between the recurred initial event and the recurred subsequent event; and
   adjusting the correlation between the initial event and the subsequent event based on the further correlation.

9. A method of forecasting a behavior of an information technology system for executing a plurality of applications, comprising:
   monitoring execution of selected applications over a predefined time period;
   compiling a trace of events indicating unintended behavior of the system during said period;
   determining a correlation between an initial event and a subsequent event in said trace;
   forecasting a recurrence of the subsequent event based on said correlation in response to a recurrence of the initial event;
   observing a recurrence of an event;
   notifying a user of said observed recurrence;
   listing, by a computer, at least a subset of all subsequent events that have a determined correlation with said observed recurred event and
   listing, by the computer, at least a subset of all initial events that have the determined correlation with said observed recurred event.

10. The method of claim 9, further comprising:
    receiving event correlation configuration information from the user; and
    updating determined correlations of the listed initial events in response to said event correlation configuration information.

11. A non-transitory computer-readable storage medium storing a computer program product for forecasting a behavior of an information technology system for executing a plurality of applications, said computer program product when executed by a computer, causes the computer to:
    monitor execution of selected applications over a predefined time period;
    compile a trace of events indicating unintended behavior of the system during said period;
    determine a correlation between an initial event and a subsequent event in said trace;
    forecast a recurrence of the subsequent event based on said correlation in response to a recurrence of the initial event;
    observe a recurrence of an event;
    notify a user of said observed recurrence;
    list at least a subset of all subsequent events that have a determined correlation with said observed recurred event; and
    list at least a subset of all initial events that have the determined correlation with said observed recurred event.

12. The computer-readable storage medium of claim 11, wherein the computer program product is executable to cause the computer to further receive an event correlation threshold from the user;
    wherein listing the at least a subset of all subsequent events that have the determined correlation with said observed recurred event comprises listing subsequent events that have the determined correlation based on said threshold.

13. The computer-readable storage medium of claim 11, wherein the computer program product is executable to cause the at least one processor to further:
    receive event correlation configuration information from the user; and
    update determined correlations of the listed initial events in response to said event correlation configuration information.

14. The computer-readable storage medium of claim 11, wherein the computer program product is executable to cause the computer to further:
    receive, in response to user input, an amendment of the determined correlation between the observed recurred event and the subset of subsequent events; and update the determined correlation based on the received amendment.

15. A system comprising:

at least one processor; and a non-transitory computer-readable storage medium storing a computer program product for forecasting a behavior of an information technology system for executing plurality of applications, said computer program product when executed causes the at least one processor to:

monitor execution of selected applications over a predefined time period;

compile a trace of events indicating unintended behavior of the system during said period;

determine a correlation between an initial event and a subsequent event in said trace;

forecast a recurrence of the subsequent event based on said correlation in response to a recurrence of the initial event; and construct a graph, wherein nodes of the graph represent events that occurred during said period and edges of the graph represent correlations between the events represented by the nodes.

16. The system of claim 15, wherein the computer program product is executable to cause the at least one processor to further:

observe a recurrence of an initial event;

observe a recurrence of a subsequent event;

determine a further correlation between the recurred initial event and the recurred subsequent event; and adjust the correlation between the initial event and the subsequent event based on the further correlation.

17. The system of claim 15, wherein determining the correlation between the initial event and the subsequent event in said trace comprises determining a probability of an occurrence of the subsequent event following an occurrence of the initial event.

18. The system of claim 17, wherein determining the correlation between the initial event and the subsequent event in said trace further comprises determining a time interval between the occurrence of the subsequent event and the occurrence of the initial event.

19. The system of claim 18, wherein at least one of the edges has a length indicating the time interval and an associated parameter indicating said probability.

20. The system of claim 18, wherein the time interval is an average time interval.

* * * * *

UNITED STATES PATENT AND TRADEMARK OFFICE
CERTIFICATE OF CORRECTION

| | |
|---|---|
| PATENT NO. | : 8,924,794 B2 |
| APPLICATION NO. | : 12/867445 |
| DATED | : December 30, 2014 |
| INVENTOR(S) | : Balasubramanya Ramananda et al. |

It is certified that error appears in the above-identified patent and that said Letters Patent is hereby corrected as shown below:

In the Claims,

In column 8, line 15, in Claim 9, delete "event" and insert -- event; --, therefor.

In column 9, line 7, in Claim 15, delete "executing" and insert -- executing a --, therefor.

Signed and Sealed this
Twenty-sixth Day of May, 2015

Michelle K. Lee
*Director of the United States Patent and Trademark Office*